US012558686B2

(12) United States Patent
Kim et al.

(10) Patent No.: US 12,558,686 B2
(45) Date of Patent: Feb. 24, 2026

(54) LAMB WAVE MODE-CONVERSION BASED BIOLOGICAL STIMULATION DEVICE

(71) Applicant: The Board of Trustees of the Leland Stanford Junior University, Stanford, CA (US)

(72) Inventors: Jeong Nyeon Kim, Palo Alto, CA (US); Kamyar Firouzi, San Jose, CA (US); Martin Loynaz Prieto, Palo Alto, CA (US); Merritt C. Maduke, Los Altos, CA (US); Butrus T. Khuri-Yakub, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 836 days.

(21) Appl. No.: 17/942,841

(22) Filed: Sep. 12, 2022

(65) Prior Publication Data

US 2023/0082180 A1      Mar. 16, 2023

Related U.S. Application Data

(60) Provisional application No. 63/243,017, filed on Sep. 10, 2021.

(51) Int. Cl.
*B01L 3/00* (2006.01)
*G01N 29/02* (2006.01)
*G01N 29/04* (2006.01)

(52) U.S. Cl.
CPC ........ *B01L 3/502715* (2013.01); *G01N 29/02* (2013.01); *G01N 29/043* (2013.01);
(Continued)

(58) Field of Classification Search
CPC ....... B01L 3/502715; B01L 2300/0645; B01L 2300/0832; B01L 2400/0439;
(Continued)

(56) References Cited

U.S. PATENT DOCUMENTS 9,689,846 B2 * 6/2017 Faustmann .......... G01N 29/032
10,989,578 B2 * 4/2021 Mayle .................... G01F 1/667
(Continued)

OTHER PUBLICATIONS

Zhou et al., "Excitation of plane Lamb wave in plate like structures under applied surface loading", 2017, Smart Materials and Structures.

(Continued)

*Primary Examiner* — Emily P Pham
(74) *Attorney, Agent, or Firm* — LUMEN PATENT FIRM

(57) ABSTRACT

Ultrasonic excitation to a sample is provided with an apparatus including: a cylindrical ultrasonic transducer, and a plate disposed on an end of the cylindrical ultrasonic transducer. The ultrasonic transducer is configured to provide a vertical vibration in operation. A Lamb wave vibration is generated in the plate by the vertical vibration of the ultrasonic transducer. The Lamb wave vibration converges at a central region of the plate, where a sample is disposed. Alternatively, a cylindrical array of ultrasonic transducers can be used instead of a single cylindrical transducer. Such an array can be driven as a phased array for beam shaping and/or multi-focusing.

8 Claims, 8 Drawing Sheets

(52) U.S. Cl.
CPC ................... *B01L 2300/0645* (2013.01); *B01L 2300/0832* (2013.01); *B01L 2400/0439* (2013.01); *G01N 2291/106* (2013.01)

(58) Field of Classification Search
CPC .... G01N 29/02; G01N 29/043; G01N 29/036; G01N 29/022; G01N 2291/106; G01N 2291/0255; G01N 2291/0256; G01N 2291/0427; G01N 2291/0428
See application file for complete search history.

(56) References Cited

U.S. PATENT DOCUMENTS 11,340,195 B2 * 5/2022 Liu ...................... G01N 29/043
2014/0058294 A1 2/2014 Gross

OTHER PUBLICATIONS

Siddiqui et al., "Lamb Wave Focusing Transducer for Efficient Coupling to Wavelength-Scale Structures in Thin Piezoelectric Films", 2018, Journal of Microelectromechanical Systems v27.

* cited by examiner

LAMB WAVE MODE-CONVERSION BASED BIOLOGICAL STIMULATION DEVICE

CROSS REFERENCE TO RELATED APPLICATIONS

This application claims the benefit of U.S. Provisional Patent Application 63/243,017 filed Sep. 10, 2021, which is incorporated herein by reference.

GOVERNMENT SPONSORSHIP

This invention was made with Government support under contract N5112152 awarded by the National Institutes of Health. The Government has certain rights in the invention.

FIELD OF THE INVENTION

This invention relates to in vitro ultrasound characterization of a sample.

BACKGROUND

Non-invasive neurotechnology has evolved from sensing to modulating neural activities utilizing electrical, magnetic, photonic, and ultrasonic methods and devices. This section briefly summarizes different kinds of contemporary non-invasive neurotechnology. Transcranial direct current stimulation (tDCS), and transcranial alternating current simulation (tACS) are types of transcranial electrical stimulation (TES) that use surface electrodes attached on the head and passes a direct or an alternating current to affect brain activity. The tACS has been reported to modulate brain oscillations related to cognitive functions. Transcranial magnetic stimulation (TMS) uses a brief, time-varying magnetic field to generate electrical fields across the scalp, skull, dura mater, cerebrospinal fluid, and cortex. Near infrared (NIR) photons were reported to be capable of modulating peripheral nerve activity, and can penetrate the cortex up to a few centimeters to produce functional effects on brain activity. Also, both mid-infrared (MIR), which produces optoacoustic effects, and far infrared (FIR) have shown the capability of modulating neural activity. Ultrasound can evoke neural activity by triggering action potentials and synaptic transmission in brain circuits by nonthermally opening voltage-gated ion channels.

Ultrasound neurostimulation offers the deepest penetration depth in the brain with high spatial-temporal resolutions among the introduced methods. Because of the advantages, it is well recognized as the most promising tool for both basic research on the nervous system and clinical application. The physical mechanisms of ultrasound neurostimulation is not yet fully revealed and have been actively studied by several groups. An ex-vivo retina study with ultrasound frequency range 0.5-43 MHz reported spiking activity of ganglion cells and increased stimulation at higher acoustic frequencies and addressed acoustic radiation force as the dominant physical mechanism of the phenomenon. The effect of focused, high-frequency (43 MHz) ultrasound on evoked action potential firing in CA1 pyramidal neurons in acute rodent hippocampal brain slices was quantitatively recorded using patch-clamp technique. The authors stated that ultrasound activated thermosensitive and mechanosensitive two-pore-domain potassium (K2P) channels through heating or mechanical effects.

The promising and common findings of the acoustic radiation force as the fundamental neurostimulation source encourage more studies to reveal the mechanistic basis of the phenomenon. Previous and current in-vitro and ex-vivo studies typically use commercial off-the-shelf focused or planar ultrasound transducers. In these cases, plane waves launched from the transducers are the stimulation sources. The plane waves propagating a certain distance through the coupling liquid inevitably experience attenuation before reaching an end in the biological specimens. The attenuation of ultrasound increases with frequency squared, meaning that the higher the ultrasound frequency, the more energy is lost for the stimulation, which undermines the practicality of using high frequency for better resolution. Another drawback of using a commercial focused or planar transducer is that the experimental setup becomes complicated to couple a transducer with the biological sample and the high-resolution imaging system. Accordingly, it would be an advance in the art to provide improved ultrasound stimulation of biological samples.

SUMMARY

We developed a new type of ultrasound stimulation and/or neurostimulation device using Lamb wave mode-conversion principle to improve the delivery of ultrasound and reduce the complexity of the in-vitro and ex-vivo experimental setup. In one example, the device had a piezoelectric cylinder, a 250 μm thick glass coverslip as a specimen stage, and a glass wall to contain the sample. The materials used were glass, however other materials such as sapphire, silicon, etc. . . . can be used for the same purpose as long as they satisfy the conditions for launching Lamb waves and hold the sample without contamination.

DETAILED DESCRIPTION

Figure 1A:
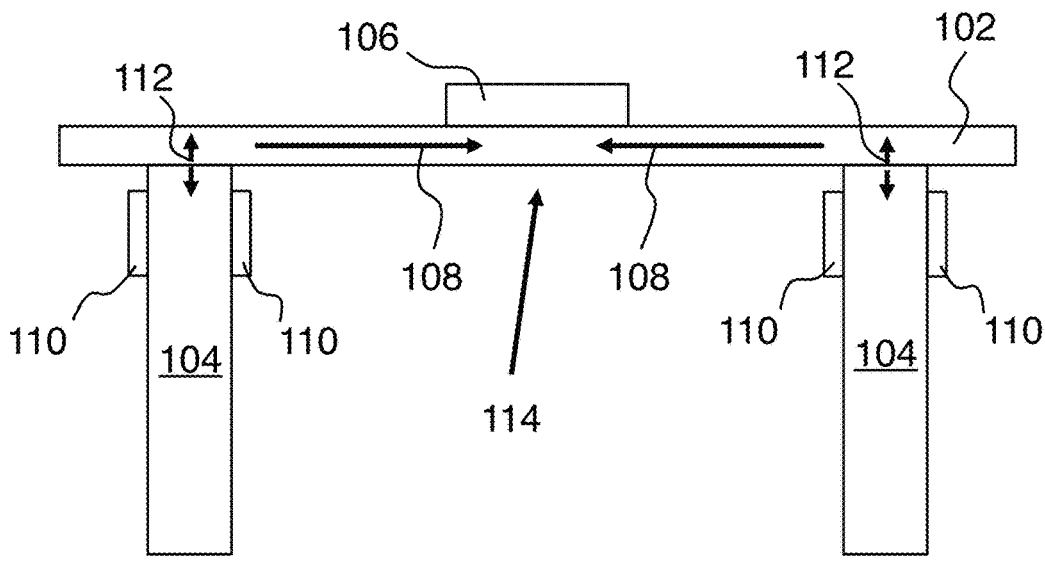
FIGS. 1A-B show a first embodiment of the invention.
Figure 1B:
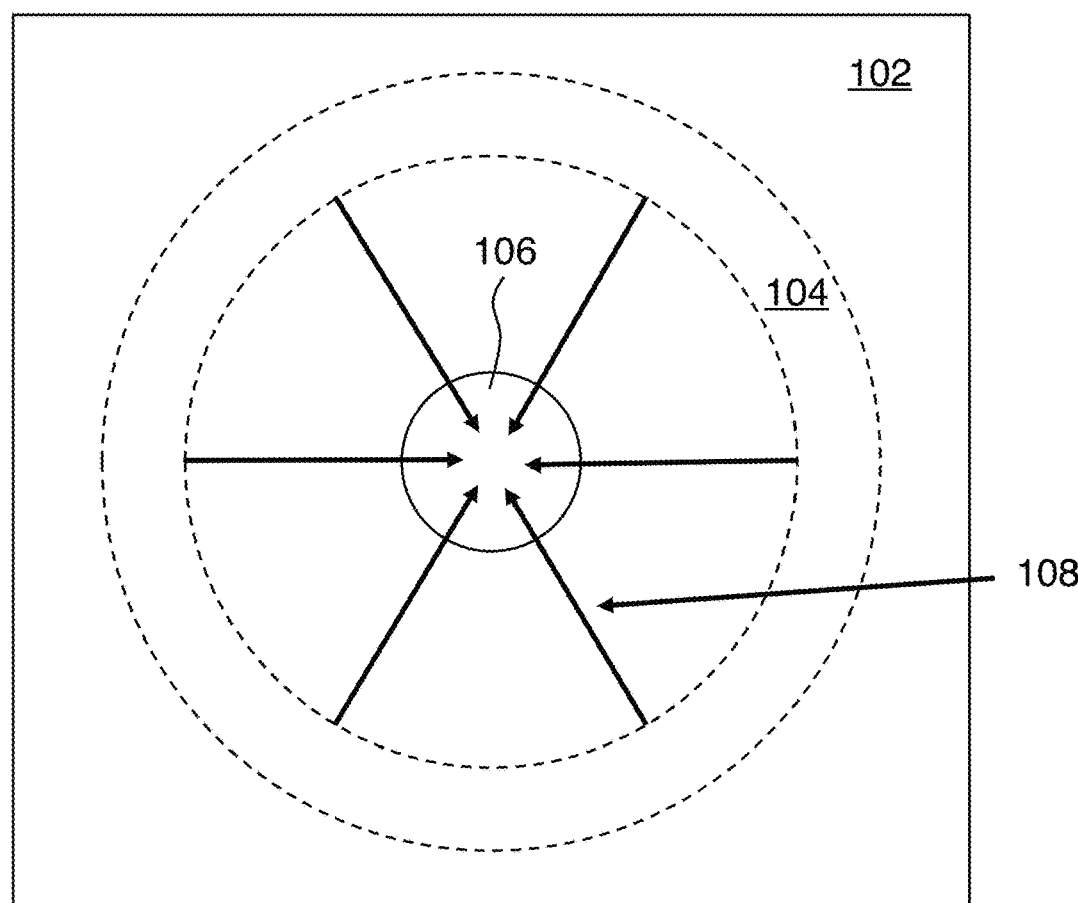

FIGS. 1A-B show a first exemplary embodiment. Here 104 is a cylindrical ultrasonic transducer, and 102 is a plate (e.g. a glass cover slip) disposed on an end of the cylindrical ultrasonic transducer. The ultrasonic transducer is configured to provide a vertical vibration displacement 112 in operation. For example, cylinder 104 can be made of a piezoelectric material and electrodes 110 can be electrically driven with an electrical source (not shown). A Lamb wave vibration (schematically shown as propagation vectors 108) is generated in plate 102 by the vertical vibration 112 of the ultrasonic transducer 104. The Lamb wave vibration converges at a central region 114 of plate 102, and a sample 106 is disposed at the central region of the plate.

The working principle is that the piezoelectric cylinder 104 (e.g., working in radial mode vibration) induce Lamb waves 108 in the glass coverslip and the antisymmetric mode Lamb waves below approximately 1 MHz, which preferably have phase velocity slower than the speed of sound of the biological solution or water in the specimen stage, get trapped in and propagate through the glass coverslip toward the center. The Lamb waves converge at the center and can leak into the biological specimen 106 placed on top of it since the waves have a dominant displacement in an out-of-plane direction. The Lamb waves are of two types: symmetric and antisymmetric. The symmetry refers to the displacement on the top and bottom surfaces being in the same direction (AS) or opposite direction (S). Symmetry is with respect to the plane of the plate. The displacement of the particles in both of these have vertical and horizontal components. The issue of slow Lamb wave has to do with the speed being lower than that of the sample (tissue) or liquid. Such slower waves cannot leak into the sample by mode conversion. If the speed is higher than that of the liquid, then the waves will leak into the liquid at an angle given by Snell's law.

Thus, in cases where the Lamb wave speed is less than the speed of sound in the sample, the Lamb wave does not leak out as a propagating wave away from the plate. Rather, fringing fields of the Lamb wave extend into the sample, in the vicinity of the top surface of the plate and couple energy into the sample. This is the region where we want the pressure fields to act. Measurements of the pressure in the sample near the plate surface demonstrate this confinement and energy transfer.

This design results in broad frequency bandwidth. Most commercial transducers and ultrasound delivery systems are limited to a narrow frequency bandwidth. This places practical limitations on the range of frequencies that can be tested in a single experimental preparation. In contrast, our Lamb wave devices have resonant modes associated with all three spatial dimensions of the piezoelectric cylinder (radial mode, vertical mode, and thickness mode, corresponding to cylinder diameter, cylinder height, and wall thickness respectively) and their higher harmonics. This results in multiple peaks in the plot of electrical impedance versus frequency, spanning orders of magnitude in frequency. Practice of the invention does not depend critically on the specific ultrasound frequencies used.

Figure 2A:
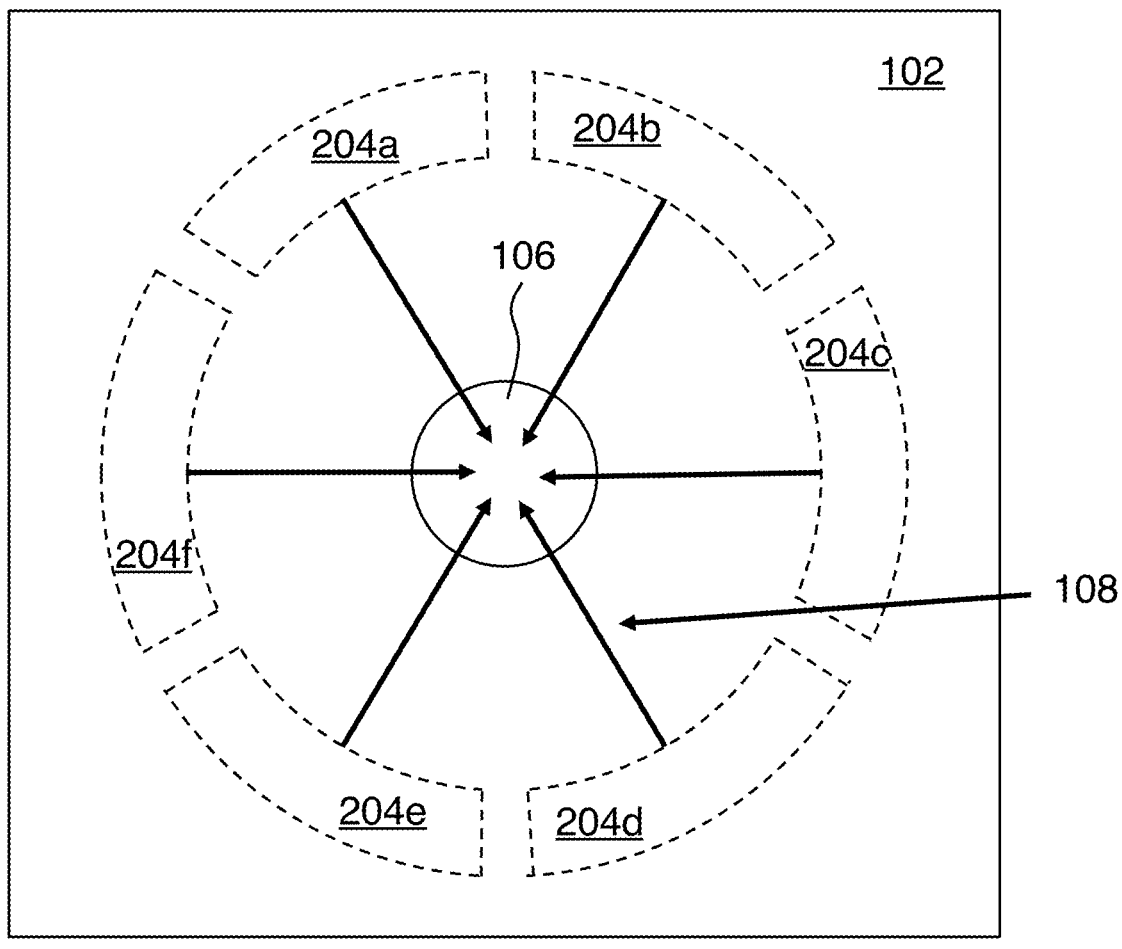
FIGS. 2A-B show a second embodiment of the invention.
Figure 2B:
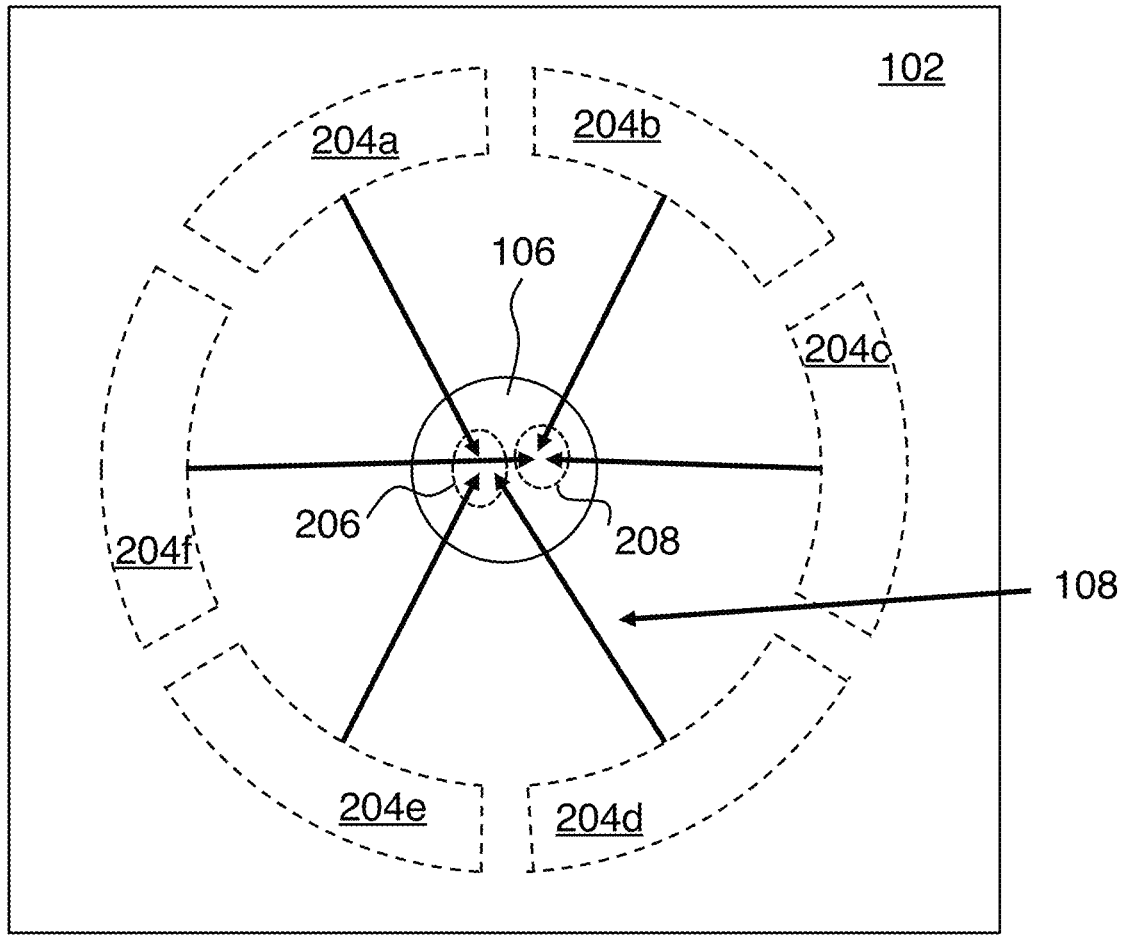

The piezoelectric cylinder of the preceding example can be divided into individual segments with independently controlled phase and amplitude, allowing multifocal stimulation and/or shaping of the spatial distribution of the acoustic pressure field. FIGS. 2A-B show some examples of this idea. The example of FIG. 2A is similar to the example of FIGS. 1A-B, except that instead of a single transducer 104, a cylindrical array of transducers 204a, 204b, 204c, 204d, 204e, 204f is employed. Here the array is shown as having 6 elements, but any number of elements can be used in practice, with some applications benefitting from 16, 64 or even more elements. In the example of FIG. 2A, each element of the array is shown as being curved. An alternative is for each transducer element of the array to be planar, since this can provide a sufficiently good approximation to the desired field patterns, especially for arrays having a large number of elements.

FIG. 2B shows one example of a capability that can be provided by such a cylindrical array. Here the array elements 204a, 204b, 204c, 204d, 204e, 204f are individually driven (amplitude and phase) such that two focuses 206 and 208 are created.

Figure 3A:
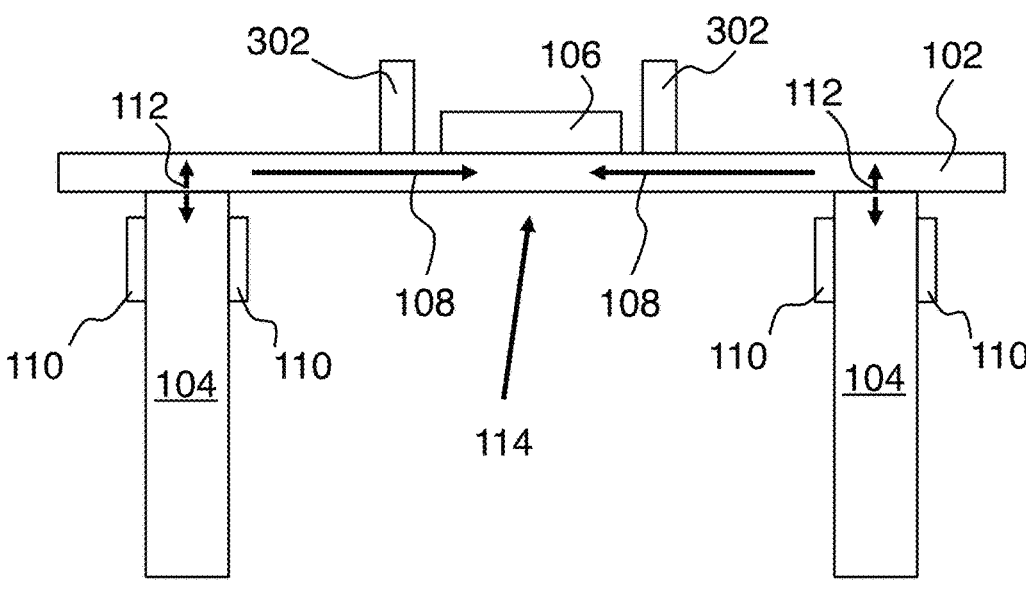
FIGS. 3A-B show a third embodiment of the invention.
Figure 3B:
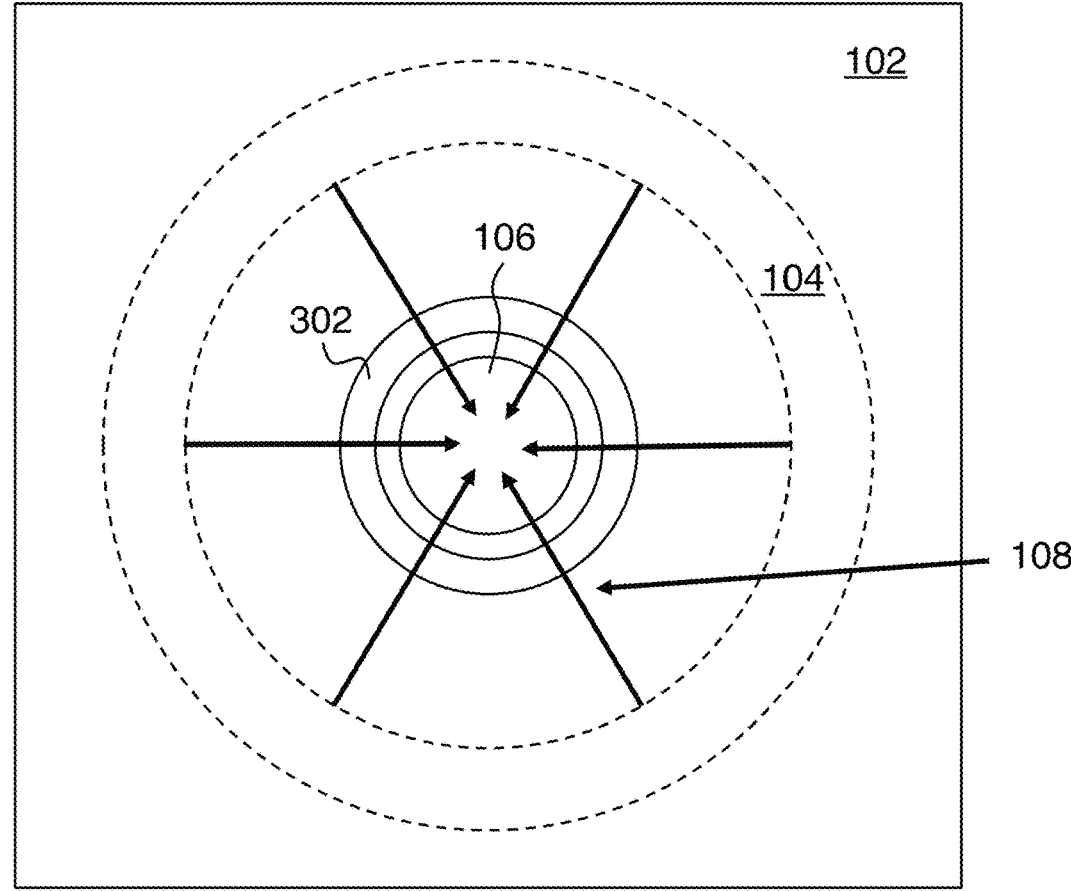

FIGS. 3A-B show another optional feature of some embodiments. Here a sample holder 302 is present to hold sample 106 in place.

Figure 4:
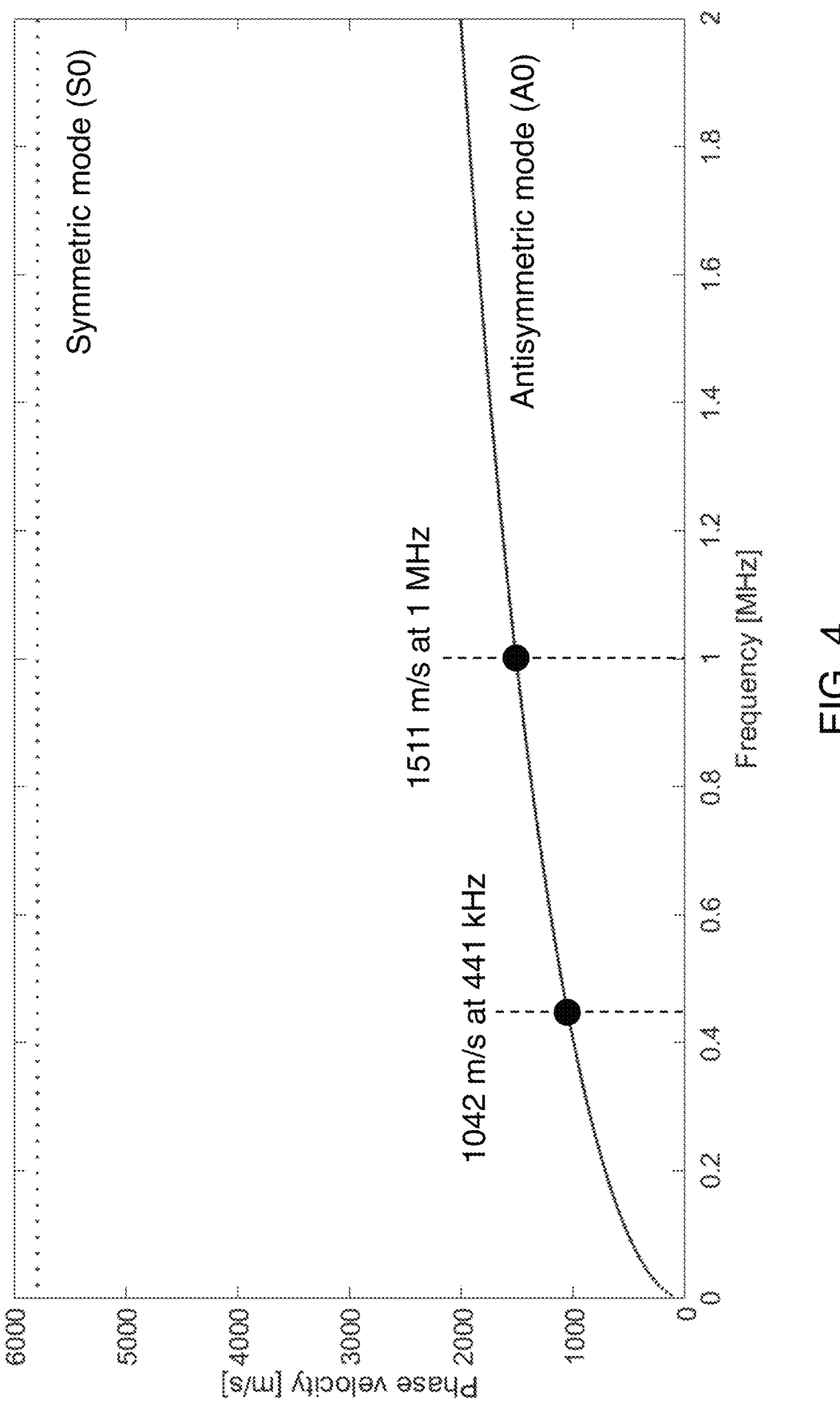
FIG. 4 is an exemplary dispersion plot of S0 and A0 Lamb wave modes.

FIG. 4 shows Lamb wave dispersion curves of a 250 μm thick glass coverslip. The dotted line curve represents symmetric mode Lamb wave (S0 mode), which has 5788 m/s phase velocity over the frequency range shown in the plot, and the solid line curve illustrates antisymmetric mode (A0 mode) Lamb wave, which has slower phase velocity.

Figure 5:
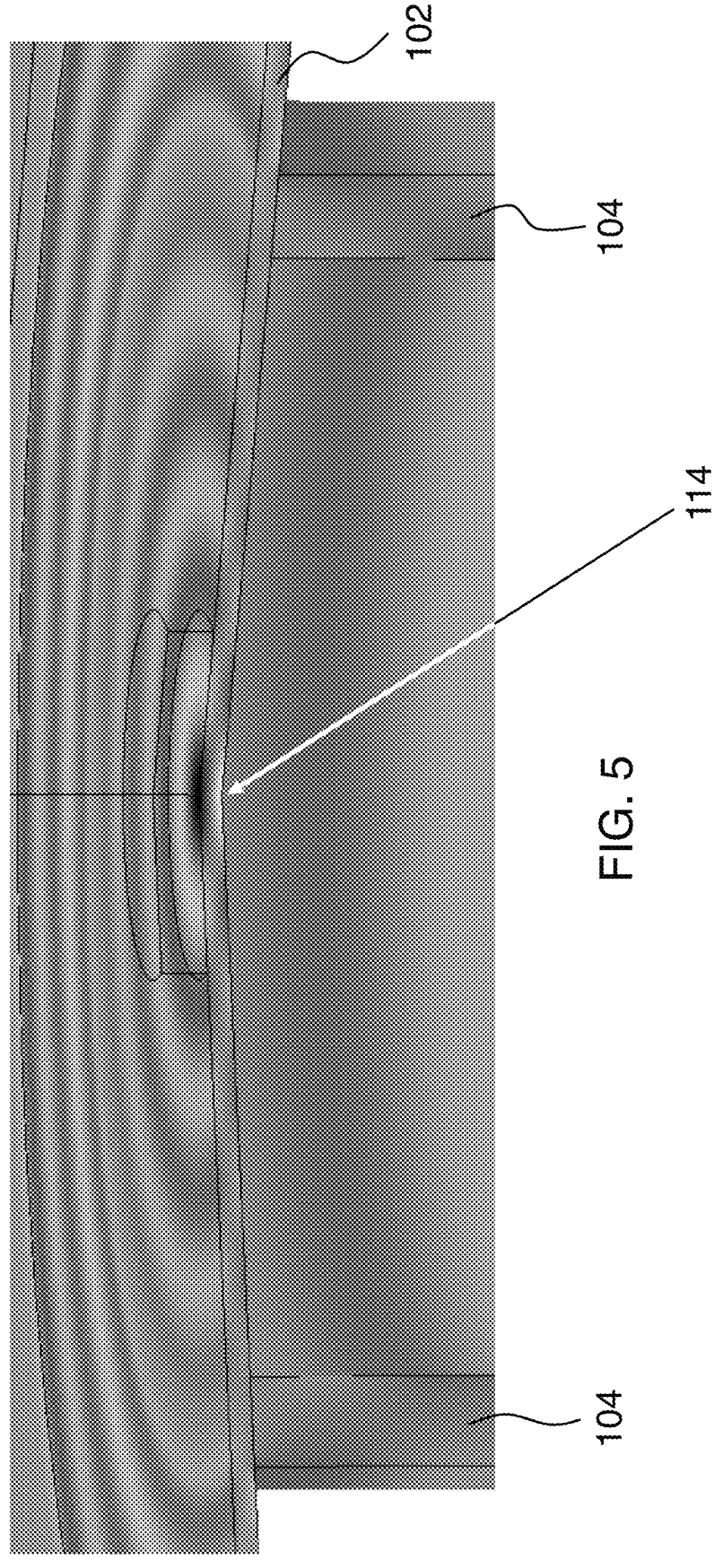
FIG. 5 shows simulated Lamb wave propagation in a plate+cylinder geometry.

The propagating of the antisymmetric mode Lamb wave is confirmed with finite element analysis (FEA) done with COMSOL Multiphysics as displayed in FIG. 5 for the frequency at 441 kHz.

Figure 6A:
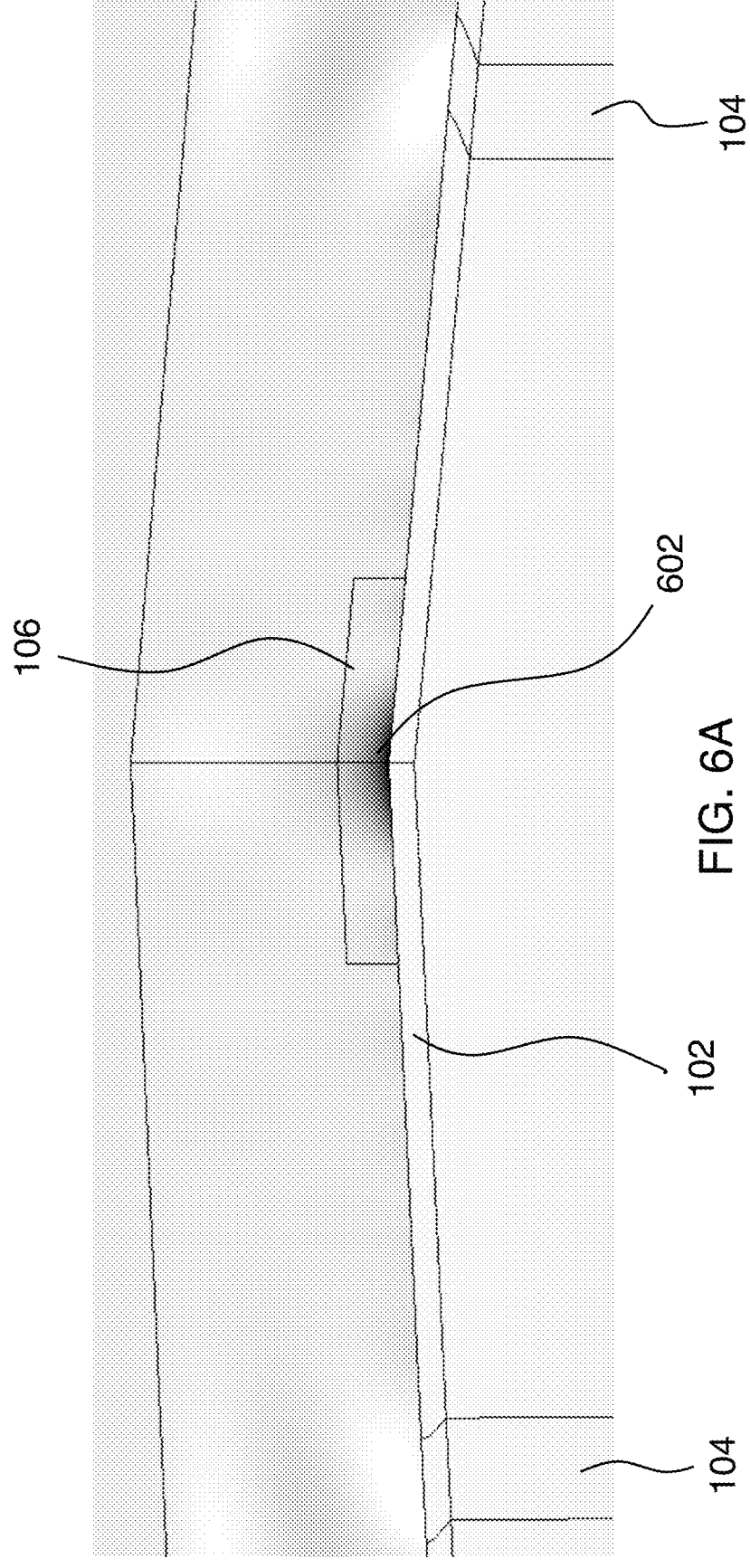
FIGS. 6A-B show simulated results for acoustic radiation force in the sample.
Figure 6B:
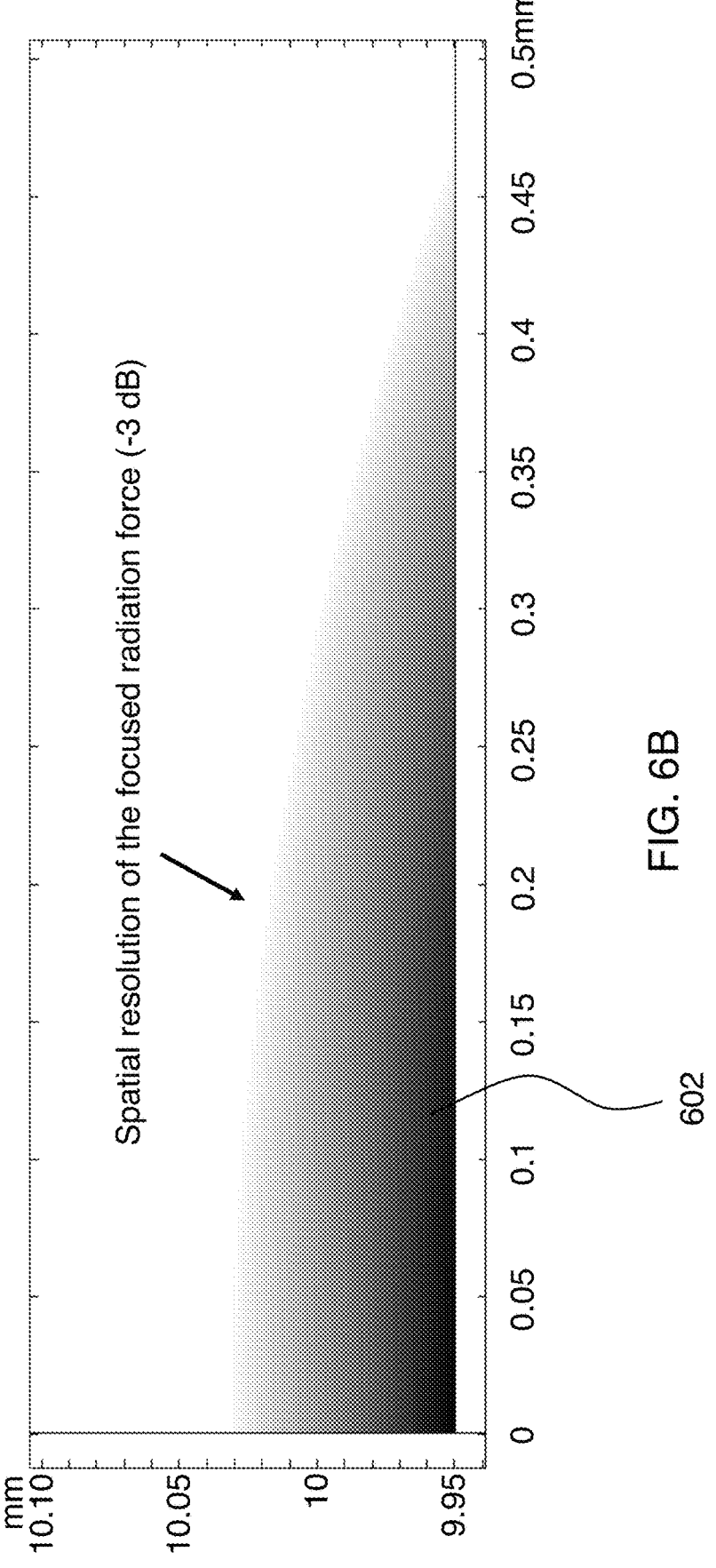

This approach uses the Lamb wave mode-conversion phenomenon to deliver ultrasound waves directly to the biological specimen on the center of the stage through the glass coverslip. The glass coverslip has higher acoustic impedance (approx. 13 MRalys) than that of water or biological solution (approx. 1.43 MRalys), which the existing methods use for acoustic coupling, and provides better propagation condition, and its thin geometry acts as waveguide path for ultrasound. These design elements minimize the loss and improve spatial resolution of the delivered ultrasound wave. FIGS. 6A-B show finite element analysis calculations of acoustic radiation force (FIG. 6A) in the biological tissue and −3 dB spatial resolution (FIG. 6B) at 441 kHz.

The acoustic radiation force formed by the converged Lamb wave shown in FIG. 5 is very well focused in the sample as illustrated in FIG. 6A. The focused acoustic radiation force has 0.25 mm axial-resolution and 0.48 mm radial-resolution. The 0.25 mm axial-resolution corresponds to the resolution of 3 MHz ultrasound in water or similar substances including human tissue and was achieved at 441 kHz.

By simply changing the dimensions of the piezo-cylinder, the device can work in wide range of ultrasound frequencies and will be able to be used for different types of biological tissue specimens. The presented devices can deliver ultrasound waves directly to the specific area of biological tissue specimen on its stage with minimal loss of ultrasound. Moreover, our devices reduce the complexity of experimental setup with a biological specimen and are broadly compatible with high-resolution live-cell and tissue imaging techniques.

The preceding examples have shown a circular cylinder for the transducer or transducer array, but that circular shape is not critical for practicing the invention. Accordingly, we define a 'cylinder' as the 3D shape formed by vertical (out-of-plane) projection of any closed plane shape, including but not limited to circles, ellipses, squares, rectangles etc. The corresponding cylinders are circular cylinders, elliptical cylinders, square cylinders, rectangular cylinders etc., and any of these shapes can be referred to as 'cylindrical'. As one example of these possibilities, an elliptical cylinder geometry has two focal points, which may be interesting in applications.

The invention claimed is:

1. An apparatus for providing an ultrasonic excitation to a sample, the apparatus comprising:

a cylindrical ultrasonic transducer;

a plate disposed on an end of the cylindrical ultrasonic transducer;

wherein the ultrasonic transducer is configured to provide a vertical vibration in operation;

wherein a Lamb wave vibration is generated in the plate by the vertical vibration of the ultrasonic transducer;

wherein the Lamb wave vibration converges at a central region of the plate, and wherein a sample is disposed at the central region of the plate.

2. The apparatus of claim 1, wherein a propagation speed of the Lamb wave vibration in the plate is less than a speed of sound in the sample.

3. The apparatus of claim 1, further comprising a sample holder configured to hold the sample in place at the central region of the plate.

4. An apparatus for providing an ultrasonic excitation to a sample, the apparatus comprising:

two or more transducers configured as a cylindrical array;

a plate disposed on an end of the cylindrical array;

wherein the two or more ultrasonic transducers are configured to provide a vertical vibration in operation;

wherein a Lamb wave vibration is generated in the plate by the vertical vibration of the two or more ultrasonic transducers;

wherein the Lamb wave vibration converges at a central region of the plate, and wherein a sample is disposed at the central region of the plate.

5. The apparatus of claim 4, wherein a propagation speed of the Lamb wave vibration in the plate is less than a speed of sound in the sample.

6. The apparatus of claim 4, further comprising a sample holder configured to hold the sample in place at the central region of the plate.

7. The apparatus of claim 4, further comprising a controller configured to provide phased-array excitation of the two or more ultrasonic transducers.

8. The apparatus of claim 7, wherein the phased-array excitation of the two or more ultrasonic transducers is configured to provide multifocal excitation to the sample.

\* \* \* \* \*